Oct. 30, 1945.  A. E. PAGE ET AL  2,387,768
KNIT FABRIC AND METHOD OF MAKING SAME
Filed Nov. 27, 1943  6 Sheets-Sheet 1
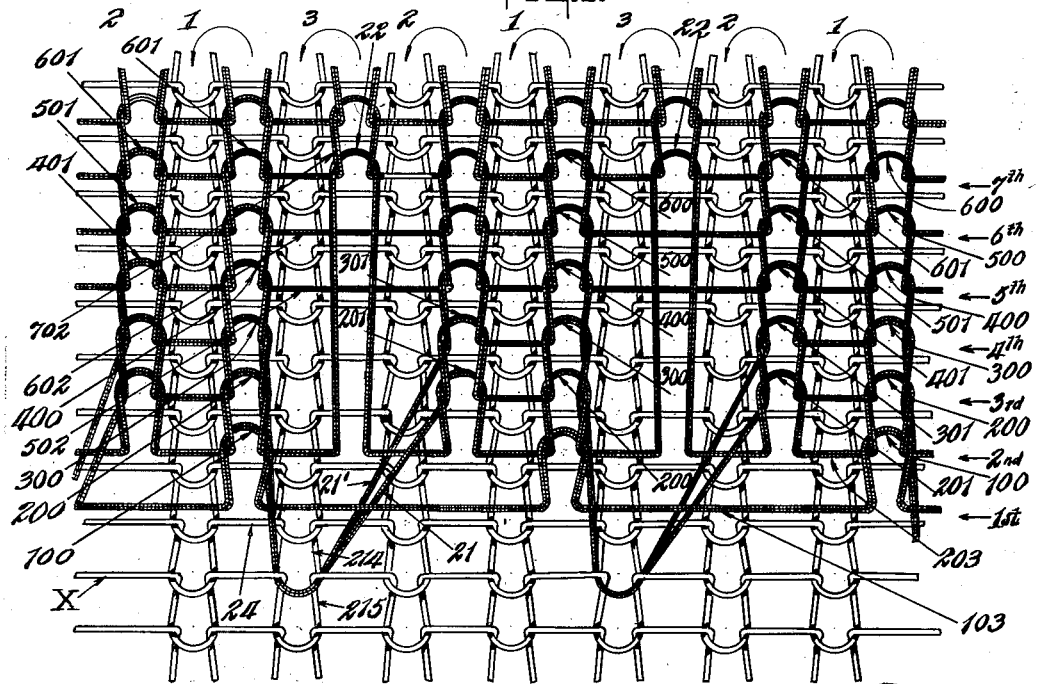
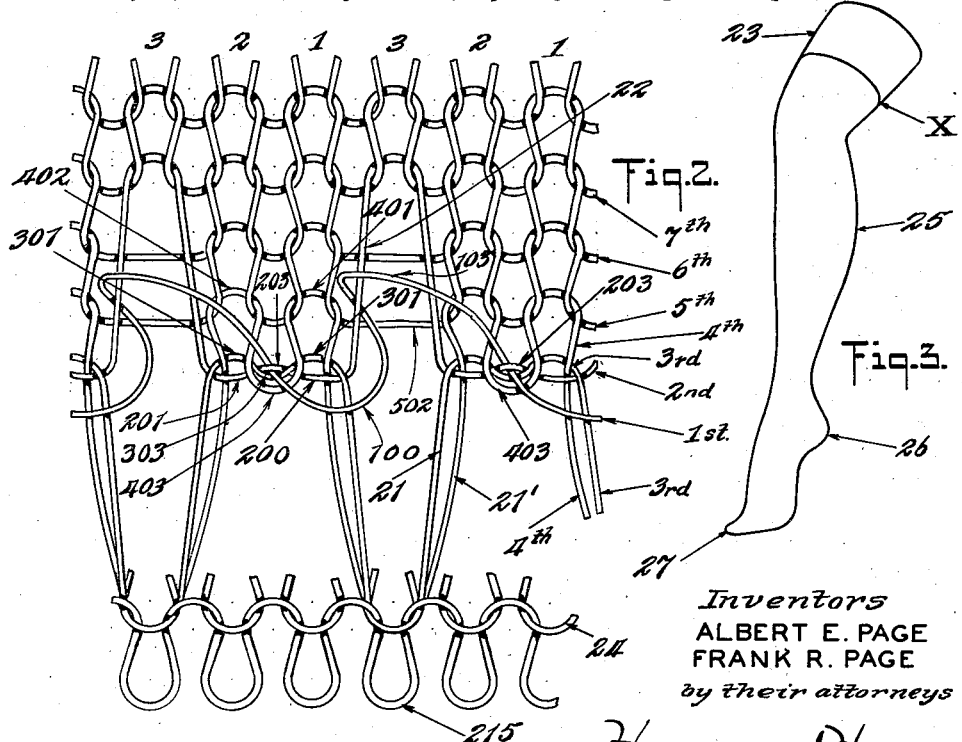
Inventors
ALBERT E. PAGE
FRANK R. PAGE
by their attorneys
Howson and Howson

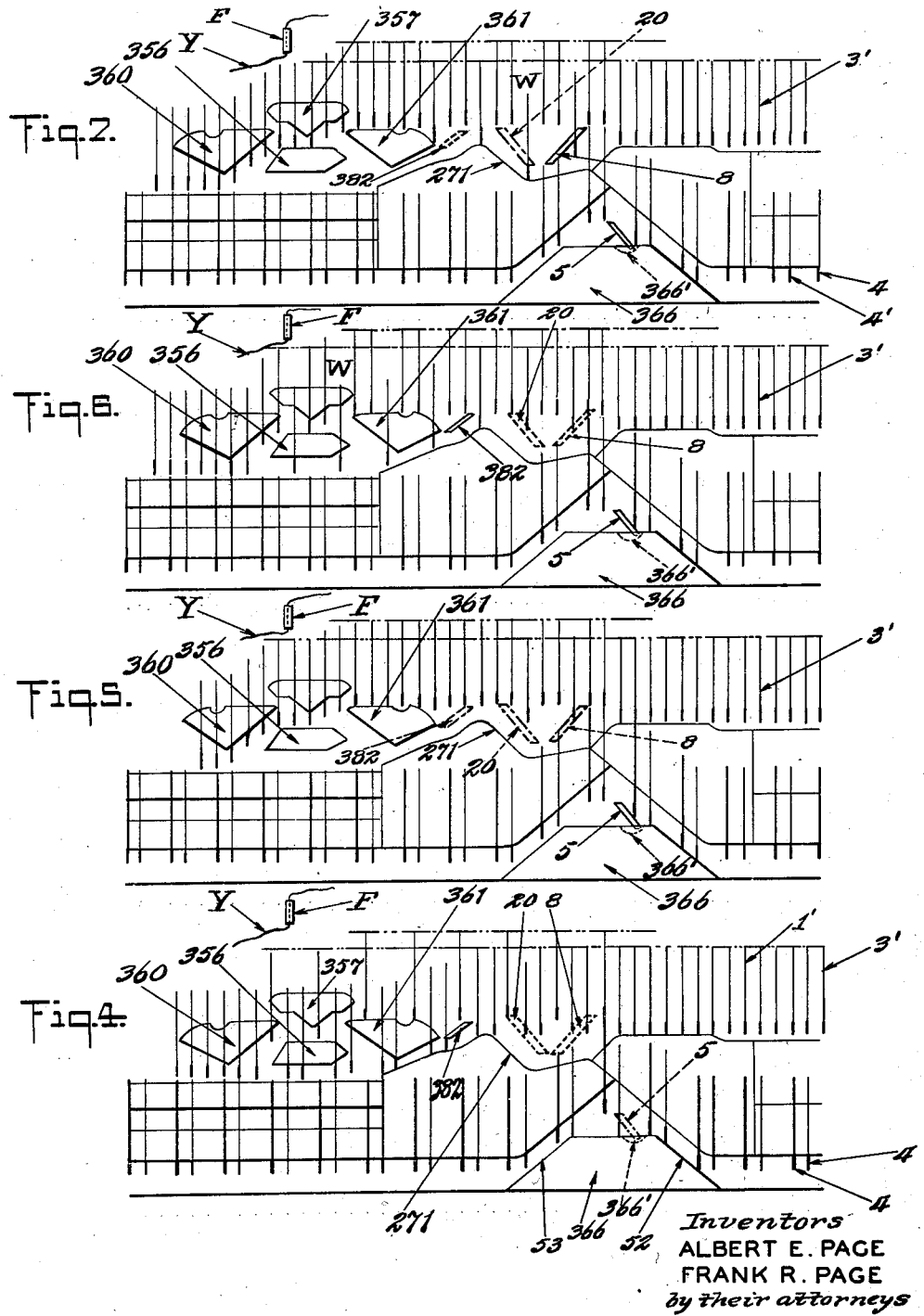

Oct. 30, 1945.   A. E. PAGE ET AL   2,387,768
KNIT FABRIC AND METHOD OF MAKING SAME
Filed Nov. 27, 1943   6 Sheets-Sheet 3

Inventors
ALBERT E. PAGE
FRANK R. PAGE
by their attorneys

Howson and Howson

Oct. 30, 1945.    A. E. PAGE ET AL    2,387,768
KNIT FABRIC AND METHOD OF MAKING SAME
Filed Nov. 27, 1943    6 Sheets-Sheet 4
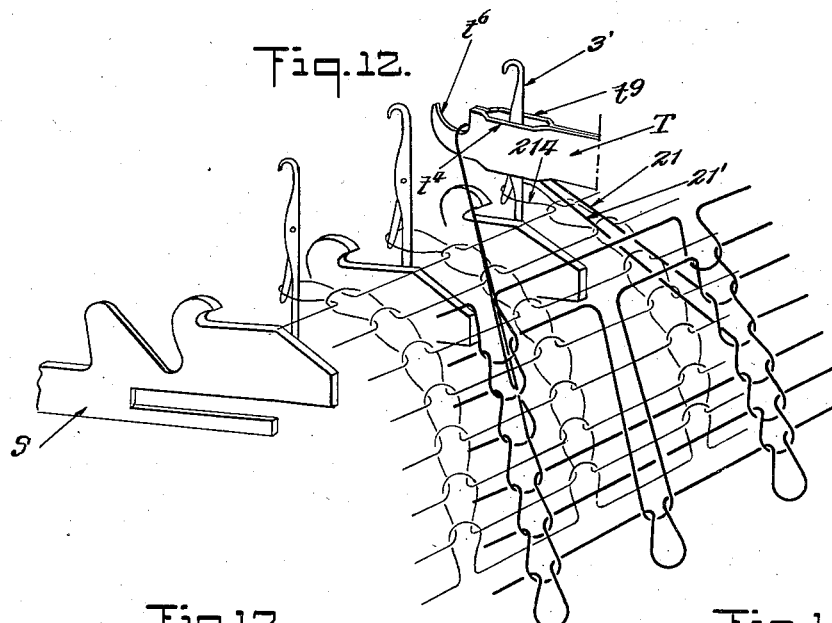
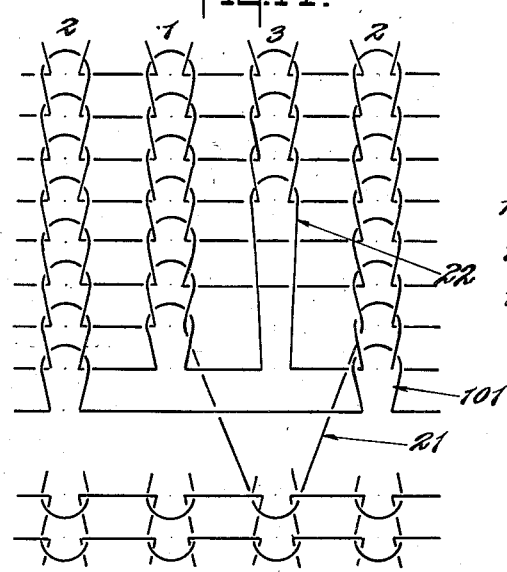
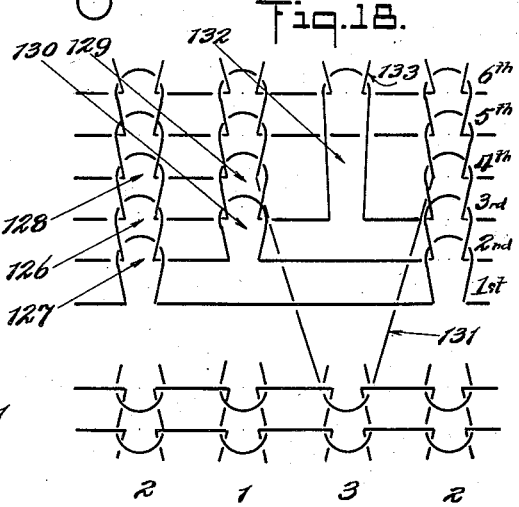
Inventors
ALBERT E. PAGE
FRANK R. PAGE
by their attorneys
Howson and Howson Inventors
ALBERT E. PAGE
FRANK R. PAGE
by their attorneys
Howson and Howson Oct. 30, 1945.   A. E. PAGE ET AL   2,387,768
KNIT FABRIC AND METHOD OF MAKING SAME
Filed Nov. 27, 1943   6 Sheets-Sheet 6
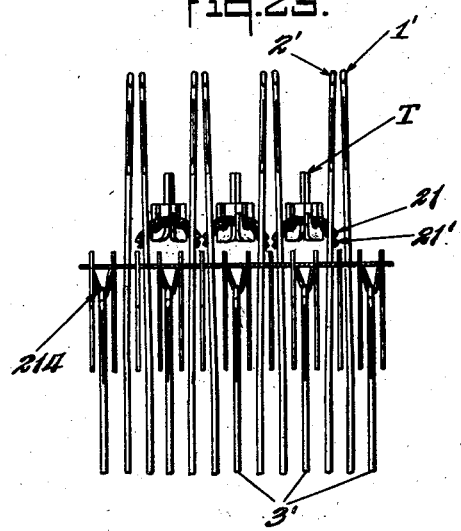
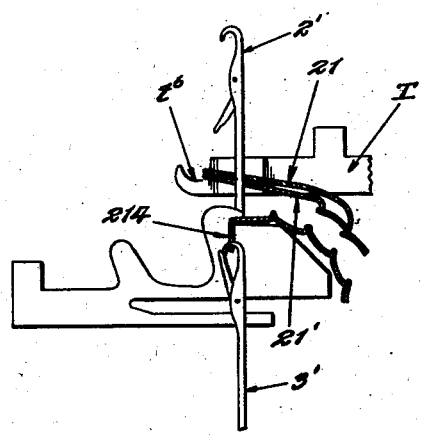
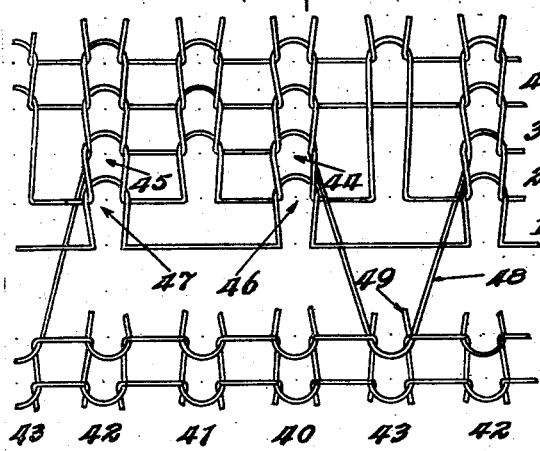
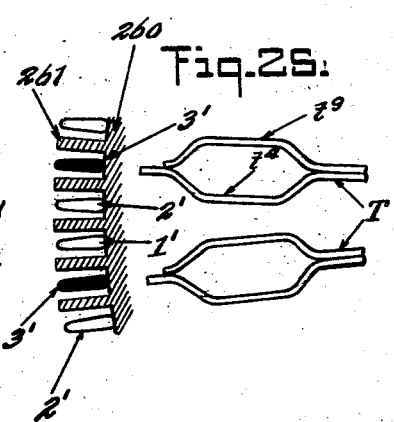
Inventors
ALBERT E. PAGE
FRANK R. PAGE
by their attorneys
Howson and Howson Patented Oct. 30, 1945

2,387,768

UNITED STATES PATENT OFFICE 2,387,768

KNIT FABRIC AND METHOD OF MAKING SAME

Albert E. Page and Frank R. Page, Laconia, N. H., assignors to Scott & Williams, Incorporated, Laconia, N. H., a corporation of Massachusetts Application November 27, 1943, Serial No. 512,000

21 Claims. (Cl. 66—173)

This invention relates to knit fabrics, and more particularly to inturned welts for stocking tops, and methods of knitting the same.

Among women's fine hosiery the most highly prized stockings are those with the smallest stitches. In circular knit hosiery, a welt of fine gauge raises the problem of multiplying the number of instruments which must be accommodated in the substantially constant space allowed for knitting a stocking of given size.

In knitting a selvage welt in such fine-gauge circular knit stockings, great difficulty has been experienced in producing an article which has (1) a satisfactorily pleasing appearance; (2) sufficient stretch; (3) the run-stop feature; and (4) that can be produced on the instruments capable of being fitted into the available space limited by the size of the stocking.

The primary purpose of the present invention is to provide a welt having those desirable features. However, it is to be understood that the invention is not restricted to circular knit stockings nor to stockings of fine gauge, but can be used to advantage with any welt and with any gauge.

A further purpose of the present invention is the making of an inturned welt wherein the number of wales is a multiple larger than two of the number of welt transfer loops. Preferably there are not more than one-third as many welt transferred loops as there are wales. Such a construction insures a more perfect welt in that it minimizes the danger of a welt loop not being transferred to and knitted at a wale. Further advantages will appear from the specification and claims.

The fabric forming the subject of the invention comprises a knit fabric, and more especially a welt, having recurring groups of at least three wales, a first course having loops in each group at a recurring wale only and all subsequent courses including loops knitted at said recurring wale. The majority of the subsequent courses also have stitches knit at intervening wales. This majority includes a second course having a loop in a recurring intervening wale interlooped with a loop of a course which is spaced from the second course by a plurality of courses and preferably on the same face of the welt as the first course; and a third course having a loop in a recurring intervening wale interlooped with a loop of the transfer course which is spaced still further away and which is on the other face of the welt. The second-named intervening wale may be the same as, or a different wale from, the first-named intervening wale. It is also to be understood that the second course and third course need not be actually the numerically second and third courses knit, but should preferably be in that order and should be near the beginning of the welt. It is also understood that there may be more than one course of the type herein designated as second, and there preferably may be more than one course of the type designated as third.

Where "recurrent" or "recurring" is used in the specification or claims, it has the significance of occurring again or repeatedly at regular intervals less frequent than successively. The expression "at least" is not intended to limit the number of wales or courses to the number illustrated or described. For example, reference in the claims to "at least one course" does not preclude two or more courses.

The novel fabric may be made by the method of forming a first course slack, successive loops in said course being spaced apart by a space which is equal to two or more wales in the fabric, forming courses each having a multiple of the number of the loops in the first course including loops recurring between wales containing the first course loops, knitting at least one later course, withholding from said later course at least one of said recurring loops formed in said second-named courses, interlooping the withheld loop from one second-named course with loops only in a still later course and interlooping the withheld loops of another of said second-named courses with recurring loops of a transfer course.

The method of the invention can be practiced and the novel fabric can be produced by hand-knitting or on a suitable machine. A suitable machine, and the one which is illustrated and described herein, forms the subject of our application filed of even date herewith, for "Circular knitting machine and method of operating same," Serial No. 512,001. However, it is to be understood that the fabric and method of producing it are not limited to the use of any particular machine.

In the drawings:

Fig. 1 is a conventionalized view from the inside of an inturned welt fabric made in accordance with one method of the present invention, the two plies of the welt being separated at the top and offset to show the construction;

Fig. 2 is a view of a few wales and courses of the same fabric as Fig. 1, showing the actual stitch construction resulting from the distortion of the loops incidental to the knitting of the welt loops;

Fig. 3 is a diagrammatic view of a stocking provided with an inturned welt adapted to be knitted in accordance with the present invention;

Figure 8:
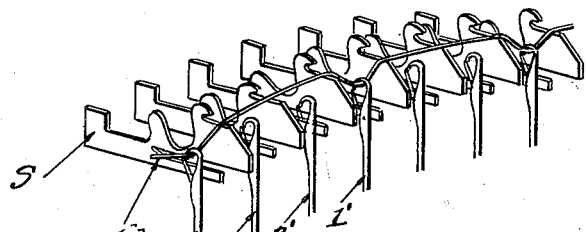
Figure 9:
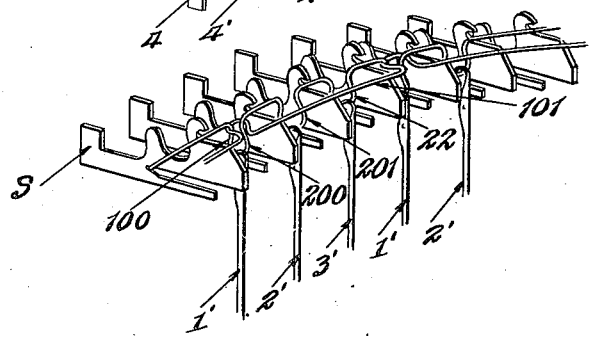
Figure 10:
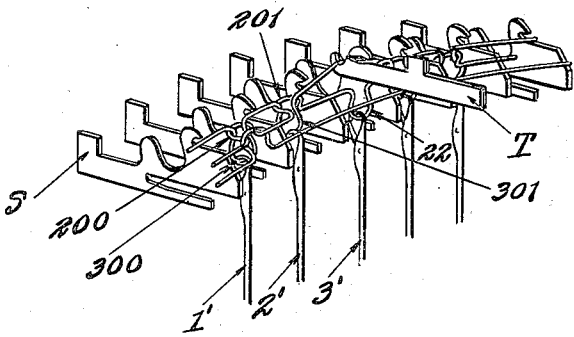
Figure 11:
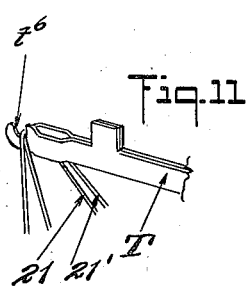
Figures 19, 20, 21:
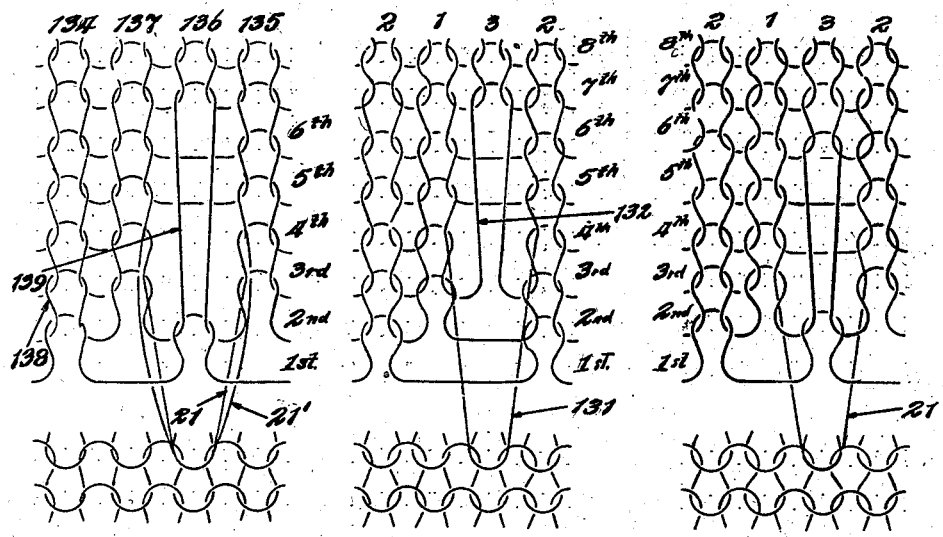
Figure 13:
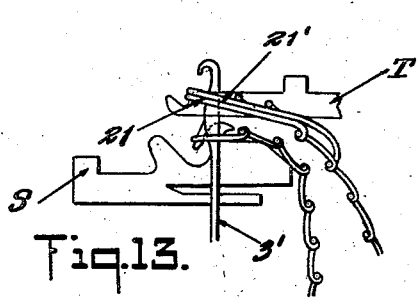
Figure 14:
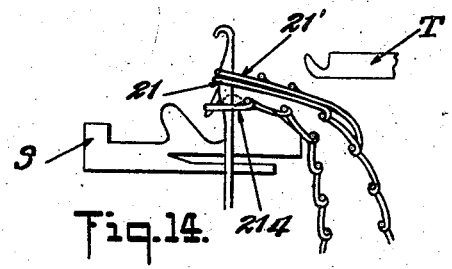
Figure 15:
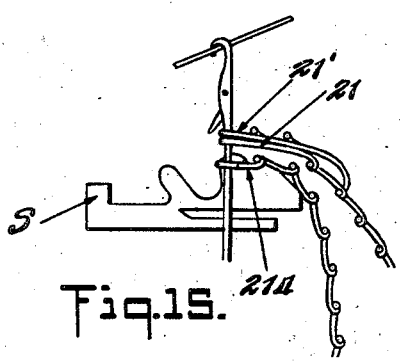
Figure 16:
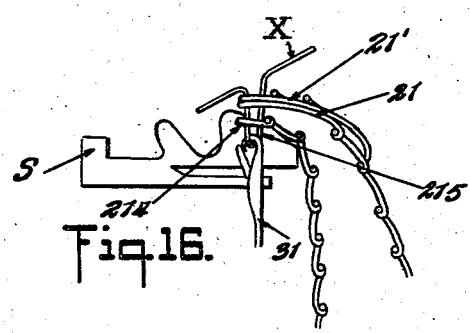

Figs. 4 to 16, inclusive, and Figs. 23, 24 and 25 show a method and means capable of producing the fabric of the invention;

Fig. 4 is a developed view of needle and jack cams as they are positioned for the knitting of the first course of the welt of Fig. 1;

Fig. 5 is a view similar to Fig. 4 showing the cams positioned for the knitting of the second course;

Fig. 6 is a view similar to Figs. 4 and 5 showing the cams positioned for the knitting of the third, fourth, fifth and sixth courses;

Fig. 7 is a view similar to Figs. 4, 5 and 6, but showing the cams positioned for the knitting of the transfer or connecting course at the completion of the welt;

Fig. 8 is a view in perspective showing a fragmentary view of a few adjacent needles and companion sinkers in the positions they assume immediately following the completion of the first course of Fig. 1 and as the needles are levelled off after passing the knitting cams; the butts of certain jacks being shown below their corresponding needles;

Fig. 9 is a view similar to Fig. 8 at the same phase of the knitting cycle, but illustrating the positions of the needles and sinkers after completion of the second course;

Fig. 10 is a view similar to Figs. 8 and 9 and at the same phase of the knitting cycle, but illustrating the relative positions of the needles, sinkers and transfer bits after the completion of the third course;

Fig. 11 is a view showing a transfer bit engaging two strands of yarn during the knitting of the fourth course;

Fig. 12 is a view somewhat similar to the views of Figs. 8, 9 and 10, but showing the needles, sinkers and transfer bit more widely spaced than in the other figures and showing those parts in the positions they assume just prior to the knitting of the transfer course;

Fig. 13 is a fragmentary detail view showing a needle rising through the bow of the companion transfer bit and through the loops held thereon;

Fig. 14 is a fragmentary view similar to Fig. 13, but showing a later phase of the knitting cycle, the needle having risen slightly and the transfer bit having been withdrawn;

Fig. 15 is a view similar to Figs. 13 and 14, but at a still later phase of the knitting cycle and showing the needle as having cleared the welt loops and engaging yarn in its hook for knitting the transfer course to connect the previously knitted courses to the leg of the stocking, thereby completing the knitting of the inturned welt;

Fig. 16 is another fragmentary view at a still later phase of the knitting cycle than that shown in Fig. 15 and illustrating the drawing of the first leg course loops through the welt stitches to form an inturned welt;

Fig. 17 is a view of a modified form of welt fabric similar to the fabric shown in Fig. 1, but having a single welt loop only;

Fig. 18 is a view of another form of welt fabric, the starting courses being modified;

Fig. 19 is a view of a modified form of welt construction wherein the first course yarn is engaged in the hooks of every other needle, the second course yarn being engaged in the hooks of all the needles;

Fig. 20 is a view similar to that of Fig. 18, but modified as to the multiple course loop;

Fig. 21 is a view of a welt construction similar to that shown in Fig. 19, except that one welt loop only is formed;

Fig. 22 is a view of still another form of welt fabric in which the welt stitches occur at every fourth wale only;

Fig. 23 is a fragmentary view in elevation, looking from the outside of the needle cylinder and showing the actual relative dimensions, as distinguished from the showing in other figures, to illustrate the centering action of the needles on interposed transfer bits;

Fig. 24 is a view in side elevation and complemental to Fig. 23; while

Fig. 25 is a view of the transfer bits, needles and needle walls enlarged to indicate the relative dimensions.

For purposes of illustration, without limiting the invention, one form of the fabric structure, as well as methods of knitting the same, will now be described, with particular reference to Figs. 1 to 16, inclusive, and Figs. 23, 24 and 25.

In Fig. 3 is illustrated the outside of an inturned welt stocking, such as one embodying the fabric of our novel invention and made in accordance with the methods herein disclosed. In the said figure, the transfer course is indicated by the reference letter X. The leg of a stocking is shown at 25, to which any desired form of heel 26, foot, and toe 27 may be joined. The stocking may be either plain or rib knit or any desired combination of the two which will hereafter be referred to as "normal" knitting.

For convenience of reference and beginning at the right of Figs. 1 and 2, the first few wales will be referred to as "1," "2" and "3," the following wales being recurring repetitions of wales 1, 2 and 3 and so numbered.

These figures show a fabric in which the first course contains a loop or stitch 100 only in every third wale with the thread floating loosely at 103 between loops. The second, third and fourth courses of the finished fabric each contains a loop in each wale; but as will hereafter be pointed out, less than the total number of loops in each of these courses is interknitted with the course immediately following. The second course contains a loop in every wale, having a loop 200 interknitted with every loop 100 of the 1st course, and two intermediate loops 201 and 22 therebetween. Loop 22 in the 3rd wale is interknitted only with the 7th course. The loops 21 and 21' of the 3rd wale in the 3rd and 4th courses, respectively, together with a loop 214 which recurs in every 3rd wale of a much later course 24, are interknitted as a composite loop by a loop 215 in the transfer course X which joins the beginning edge of the welt 23 to the leg 25 of the stocking.

Each of the 5th and 6th courses has loops in wales 1 and 2, but only floats 502, 602 in wale 3. The 7th course is normal, except that its loop 702 interloops with a loop 22 from the 2nd course instead of with the immediately preceding course. The rest of the welt is composed of normal courses until the final transfer course X on the outer ply of the welt is reached. In that course, as has already been mentioned, every third wale, in addition to containing a loop 215 from course 24, contains a loop 21 and a loop 21' from the 3rd and 4th courses, respectively.

Thus the welt fabric comprises a recurrent series of wales 1, 2 and 3. Each wale 1 is composed of a loop in every course, the loop of the 1st course interlooping with a corresponding loop of the 2nd course, and the loop in each other course interlooping with the corresponding loop of the immediately preceding and succeeding courses. In each wale 2 there is no loop in the course numbered 1st, but all other courses contain a loop in each wale 2. In each such wale, loop 201 of the 2nd course interloops with a corresponding loop 301 of the 3rd course, and the loop in each other course interloops with a wale 2 loop of its immediately preceding and succeeding courses. In each wale 3 the 1st course has no loop and the 2nd course has a loop 22 interlooped with a corresponding loop 702 of the 7th course. Each of the 3rd and 4th courses has, respectively, a loop 21 or 21'.

In each of the 5th and 6th courses there is no loop in each wale 3—only a float; while in the 7th course the loop 702 interloops above with a corresponding wale loop on the 8th course and interloops below with loop 22 of the 2nd course, as already pointed out. As shown in Figs. 1 and 2, the succeeding courses following the 7th course of the welt, both on the inturned ply and the outside ply, are normal until the transfer course X is reached. In that course, every third wale contains a loop 21 and a loop 21' from the 3rd and 4th courses, respectively, in addition to a loop 214 knitted in course 24. It will be understood that the number 24 does not indicate that the course so numbered, which is the end of the welt, is necessarily actually the 24th course knit, as the welt may contain any desired number of courses.

It is to be understood that the "normal" courses of the welt which follow the novel structure illustrated in courses 1 to 6 inclusive need not necessarily comprise plain knitting. The inclusion of fancy stitches such as float or tuck stitches is not precluded.

For the convenience of describing the method of knitting the fabric, the formation of loops or stitches in the first few courses has been described. As a matter of fact, in the completed fabric (as shown in Fig. 2), the formation of normal knitted loops is not apparent until the knitting of the 3rd or 4th course, due, in part, to the pull exerted upon the yarn of the first few courses incidental to the formation of the welt loops 21 and 21'.

In Fig. 1 the welt loops 21 and 21' are shown distorted in view of the offsetting of the inner and outer sections of the welt, which offsetting more clearly shows the superposed stitches of the two two sections of the welt. Actually, and as shown in Fig. 2, the welt loops 21 and 21' are symmetrically disposed with respect to the wales of which they form a part.

As shown in Fig. 2, the 1st course yarn assumes a wavy formation and some of the loops in the 2nd and 3rd courses also become distorted. In the 2nd course the loop formation is distorted at the wales 1 and 2. The elongated loops 22 in wales 3, however, retain their identity, due to being interlooped with the 7th course. Following the 2nd course, from right to left, in wale 3 an arm of each loop 22 passes under the 3rd course loop 21 and over the 4th course loop 21', emerging on the left at 200 in wale 1. Continuing to the left, from there the 2nd course yarn passes again under the 3rd and 4th course yarns, emerging at a sinker loop 203, more or less in the appearance of a knot involving also the 1st course yarn. From loop 203 the yarn of the 2nd course again passes under the 3rd and 4th course yarns, emerging at 201 in wale 2, and completes the cycle by again passing over an arm of the 4th course loop 21' and under an arm of the 3rd course loop 21 and into the right arm of the next loop 22. Beginning at the aforementioned knot, following the 1st course from right to left, the yarn passes under the sinker loop 203 between wales 1 and 2 and floats loosely across wales 2 and 3 at 103, passes back under the left arm of loop 22 and forms loop 100 by passing over loops 403 and 303 of the 3rd and 4th courses and again under the 2nd course yarn at 203.

As shown in Fig. 2, the loops 21' formed during the 4th course of knitting are forced out laterally beyond the 3rd course loops 21 more or less in the form of a bow, by reason of the yarn extending from the side arms of the loops 22 passing under the arms of the loops 21 and over the arms of the loops 21'. This bowing out of the loops 21' assists materially in filling up the space between adjacent welt loops, as shown in Fig. 2.

The knot-like formations serve to retain the yarn leading from the arms of the loops 22 in such a position as to maintain and preserve the bow or lateral bending of the loops 21' so that the side arms of the loops 21' extend laterally beyond the companion arms of the loops 21.

The two loops 21 and 21' are particularly useful in using yarns having little friction, such as "Nylon."

In the foregoing description the yarn Y has been referred to as a single yarn. In actual practice two or more yarns, such as a welt yarn and a reinforcing yarn, may be fed to the needles for the make-up courses, say the first four to six courses, after which the reinforcing yarn may be withdrawn and the welt yarn alone fed to the needles. The feeding of the welt yarn may continue a short distance beyond the welt, at which time the leg yarn is moved to a feeding position and the welt yarn withdrawn. Thus, reference to yarn Y may include the feeding of two or more yarns, as one yarn, to the needles, and does not eliminate the possibility of yarn changes, e. g., the leg or other yarn may be substituted for the welt yarn during the knitting of the welt.

The several courses shown in Figs. 1 and 2 may be formed by the following method:

The 1st course is knit very slack, so that the loops 100 which are formed therein will occur without strain at every third wale as the welt fabric is subsequently knit.

The 2nd course is formed by interknitting a recurring loop 200 in each wale 1 with each loop 100 of the 1st course, and loops 201 and 22 are formed therebetween, starting wales 2 and 3, respectively. Loop 22 is then held out of action until a later course. In the 3rd course, loops 300 and 301 are knit and made in wales 1 and 2, respectively, while loops 21 are formed in wales 3 but held out of action until the completion of the welt. The 4th course is formed like the 3rd, with loops 21' held out of action in wales 3. Loops 400 and 401 are knit into wales 1 and 2, respectively. In each of the 5th and 6th courses, loops 500 or 600, respectively, are knit in wales 1, and loops 501 or 601, respectively, are knit in wales 2, and the thread is floated across wales 3, no loop being formed in these courses in wales 3. The floats are numbered 502 and 602 in the drawings. In the 7th course a loop is knit in every wale, the loops in wales 1 and 2 being interknit with the 6th course, and the loops 102 in wale 3 being interknit with loops 22 which were formed in the 2nd course and have been withheld from knitting. A plurality of normal courses are then knit, to finish the inner ply and form the outer ply of the welt, until the course 24 is reached. This course is knit normally, but in addition loops 21 and 21' in wales 3, which had been withheld from action since they were formed in the 3rd and 4th courses, respectively, are now picked up with loops 214 in wales 3 of the course, and when the following course is knit they are interknit as composite loops with loops 215 in wales 3 of course X.

Referring to Figs. 4 to 17, inclusive, which show part of a machine, the sequence of operation of the needles and cams in making the novel welt is described next.

In Figs. 1 and 2 the inturned welt shown is the outer face of the fabric, that is, the face of the fabric which is normally adjacent the inner wall of the cylinder while being knit. Hence in Figs. 1 and 2 the knitting has been described as proceeding from right to left. On the other hand, Figs. 4 to 7 show views from the inside of the needle cylinder, the needles traveling from the right to the left, knitting consequently proceeding from the left to the right.

*First course (Figs. 4 and 8)*

A thread is laid on only every third needle (see Fig. 8). The wales 1, 2 and 3 are knitted by needles 1', 2' and 3', respectively. As shown, especially in Fig. 8, needles 1' are provided with long butt jacks 4 in the same cylinder slots with the needles. Each needle 2' has a short butt jack 4', while the needles 3' have no jacks. The long butt jacks 4 companion to every third needle 1' are engaged by a fixed cam 366 and a radially movable cam 5 (see Fig. 4), which latter cam at first is partially advanced to engage only the long butt jacks. The lower end of cam 5 lies in a notch 366' in the upper face of cam 366. The engagement with the long butt jacks elevates them, which jacks in turn elevate their companion needles 1' so that their butts shall pass above the depressing cam 382, the cams 20 and 8 being withdrawn at this time so as not to engage the needle butts. As a consequence thereof the needles 1' pertaining to the said long butt jacks pass above the cam 382, being depressed by the top center cam 357 and the knitting cam 360. These needles take yarn Y in their hooks, which yarn is fed to the needles through the instrumentality of any suitable yarn guide F, such as the usual yarn lever. After engaging the yarn Y in their hooks, the long butt jack needles, being depressed by the cams 357 and 360, pass through the usual knitting wave, without knitting, however, as said needles have no previous course stitches in their hooks.

The cam 382 engages the butts of all the other needles except the elevated, long butt jack needles 1', the said cam 382 depressing the butts of said other needles to pass below the usual leading stitch or clearing cam 361 and below the cams 356 and 360. As a consequence of this, said needles do not engage yarn in their hooks for this course of knitting. The engagement of the yarn Y by the long butt jack needles 1' only is illustrated in Fig. 8.

*Second course (Figs. 5 and 9)*

For this course of knitting, cam 8 remains withdrawn (Fig. 5). The cam 20, which has been moved in adjacent to the short butts of the needles during the movement thereof past the said cam 20, elevates all of the long butt needles, the short butt needles riding up cam 271 and moving past (without being depressed) the partially retracted cam 382. They are thereafter further elevated by cam 361 and then pass through the knitting wave by engaging the top center cam 357 and stitch cam 360. Thus the long butt needles are all elevated by the cam 20 to pass above cam 382, thereafter being engaged by cams 357 and 360 to pass through the knitting wave. The short butts of needles having short butt jacks miss the cam 382 and likewise engage cams 357 and 360 to pass through the knitting wave. The engagement of the yarn by all the needles, as well as the drawing of the second course yarn loops 200 through the previous course loops 100 by the long butt jack needles, is illustrated in Fig. 9.

The jack cam 5 may be conveniently moved in to a position to engage the short butt jacks as well as the long butt jacks, although said cam serves no function during this course of knitting as the cams 20, 271 and 362 would elevate all of the needles.

*Third, fourth, fifth and sixth courses (Figs. 6, 10 and 11)*

For the knitting of the third course the cam 20 is withdrawn (Fig. 6), cam 8 remaining withdrawn. The cam 5 now engages the short butt jacks 4' of needles 2', as well as the long butt jacks 4 of needles 1', thus raising those needles above the cam 382 which depresses only the jackless needles 3', said cam 382 having been moved all the way in for this course to engage both the long and short butt jackless needles.

In this way the long and short butt jack needles 1' and 2' are caused to engage yarn Y in their hooks and knit by virtue of the cams 357 and 360, said needles drawing loops 300 and 301 through previous course loops 200 and 201, respectively, as shown in Figs. 1 and 10.

The jackless needles 3', having been depressed by the cam 382, pass below cams 361 and 356, as indicated in Fig. 6. At the point indicated by "W" in said figure, the transfer bits T are projected (Fig. 10) to engage the yarn Y in their hooks or notches t⁶, being then partially retracted. The needles thereafter are all levelled off to the elevated position shown at the right of Fig. 6.

The fourth course of knitting is a repetition of the third course, the transfer bits T engaging the second strand of the yarn Y in their hooks, as indicated in Fig. 11.

The fifth and sixth courses, insofar as the needle movements are concerned, are duplicates of the third and fourth courses. However, during the knitting of these courses and until the transfer course X is knitted, the transfer bits T are partially retracted, holding the two separate-course welt loops 21 and 21' in their hooks.

During the knitting of the fifth and sixth courses, the jackless needles 3' continue to be depressed by the cam 382 to pass below the knitting cams, the yarn Y floating across the welt wales 3, as shown at 502 and 602 in Fig. 1. It has been found desirable not to permit these needles 3' to knit for at least one course (two courses being shown) immediately following the engagement of the yarn by the transfer bits during the knitting of the fourth course. If the jackless needles engage yarn and knit during the fifth course, the yarn may be unduly strained and occasionally broken.

During the knitting of the sixth course and while the short butt needles are passing, the cam 20 is moved to a position to engage the long butts of the needles, and at the beginning of the seventh course the long butt needles are thus elevated to pass above the cam 382. While the long butt needles are being elevated by the cam 20, the cam 382 is retracted so as not to elevate the short butt jackless needles. The movement of cam 20 to a position to engage the long butts prior to the retraction of cam 382 avoids the depression of some of the long butt jackless needles by the depressing cam 382.

Seventh course

For this course of knitting the cam 8 remains withdrawn and cam 20, having been moved to a position to engage the long butt needles during the knitting of the sixth course, raises the long butt needles to pass above the cam 382. While the long butt needles are being elevated by cam 20, the cam 382 is retracted, following which cam 20 is also retracted. The needles thereafter and for the knitting of the seventh course pass through the usual knitting wave, their butts riding up cam 271 and cam 361.

During the knitting of this course, the long or held loops 22 (engaged in the hooks of the jackless needles 3' while the second course was being knitted) are cast off their needles, loops 102 being drawn through them. The long loops 22 thus extend across several courses constituting multicourse loops.

Following the sixth course of knitting, all the needles knit a sufficient number of courses to form the inturned welt, at the termination of which a transfer course is knitted.

Transfer course

The knitting of the transfer course is shown particularly at Figures 7, 12 to 16 inclusive, 23, 24 and 25.

For the first time the transfer cam 8 is moved to an inward position, the cam 5 being then in a position to raise the needles 1' and 2'—which correspond to the long and short butt jacks—above the said cam 8 which depresses the remaining or jackless needles 3' (Fig. 7). These needles are companion to and located in line with the transfer bits T.

As the jackless needles 3' are depressed by the cam 8, the transfer bits T are moved forward (by a cam not shown) over the depressed needles (Fig. 24), and at W (Fig. 7), the needles on each side of the transfer bits being raised and centering the bits as shown particularly in Fig. 23. The centering maintains the loops 21, 21' in alignment with their companion, depressed needles, thus insuring that the depressed needles shall rise through the bends or bows $t^4$, $t^9$ of the bits (Figs. 25 and 12). The depressed jackless needles 3' companion to the transfer bits are then elevated by cam 271 and further elevated by cam 361 (cam 382 being fully retracted) to the successive positions illustrated in Figs. 12, 13, 14 and 15. The cams 357 and 360 then engage the butts of the jackless needles, causing them to pass through the usual knitting wave, i. e., from the position illustrated in Fig. 15 to that of Fig. 16. During this time the yarn for the transfer course X is drawn through the welt loops 21 and 21', as well as through the previous course stitch 214, thus forming a leg course stitch 215. The welt loops are thus interknitted with a following course of the stocking fabric.

The knitting cycle for connecting the welt is illustrated in Figs. 12, 13, 14, 15 and 16, in the following steps:

Fig. 12 shows the needle 3' after it has formed the loop 214 of course 24 and has been raised through bows $t^4$, $t^9$ of the transfer bit, which holds in its notch $t^8$ the loops 21 and 21' from the 3rd and 4th courses, respectively.

Fig. 13 shows the loops 21 and 21' on the transfer bit T about to be engaged by the companion needle;

Fig. 14 shows the transfer bit T retracted and the welt loops 21 and 21', as well as the previous loop 214, adjacent to or on the latch of the needle;

Fig. 15 shows the latch of the needle as having cleared the welt loops 21 and 21', as well as the previous course loop 214, and engaging the yarn in its hook to form loop 215 of the transfer course X;

Fig. 16 shows the welt needle as having drawn the loop 215 through the previous course loop 214 and the welt loops 21 and 21'.

The hereinbefore mentioned centering of the transfer bits T by the adjacent and raised needles, i. e., the ones on each side of the transfer bits, insures the knitting of the fabric illustrated in Figs. 1 and 2 in that such centering makes certain that each such companion and depressed needle 3' (Figs. 23 and 24) shall pass into the bows $t^4$, $t^9$ of the transfer bit and through the held loops 21 and 21'. (Fig. 12). This centering is of especial importance in fine-gauge machines. In such machines the needles are relatively thin and flexible and the same is true of the transfer bits themselves, as a consequence of which a slight needle or bit deflection may cause the rising needle to miss its loops 21 and 21' by passing to one side thereof. For example, when a transfer bit and adjacent needles (with special reference to Fig. 23) are of such relative dimensions and are so spaced as to permit side-play of the transfer bit when in the projected position, there is possibility of the transfer bit tilting to one side to such an extent that the companion welt needle, when raised to the position of Fig. 12, will not pass into the bow of the bit, but to one side thereof. This tilting may flow from the uneven tensioning of the tails of the bits or possibly by variation of such tension because of the heat treatment in manufacture. In any event, it has been observed that pressure upon the tensioned tails of the transfer bits will cause such bits to cant to one side and to such an extent that their companion needles will fail to rise through the bows of the bits, as well as through the welt loops held thereon. Furthermore, when the raised needles (Figs. 23 and 24) are of such thin stock, for example, as .012½", and rolled to .010½", where engaged by the transfer bits T (Figs. 12 and 23), they may be initially bent quite easily. However, when they are bent to the extent indicated in Fig. 23, they will resist further bending and thus center the bits midway of the normal positions of the raised needles on each side of the bits.

The centering may be secured by the allocating of the jackless or welt needles 3' to every third or fourth needle, for example, instead of to every other needle, as heretofore practiced. Such an arrangement provides two or more non-welt wales, such as wales 1 and 2 (Figs. 1 and 2) between adjacent welt wales 3 where the loops 21, 21' and 22 are formed. By employing only every third needle, as a welt needle, as illustrated, there are two needles between adjacent transfer bits (Fig. 23). As a consequence of the disposition of needles as shown in Fig. 23, said transfer bits may be, and preferably are, made of such a dimension as to provide a snug fit (without the interposed yarn) between the needles on each side thereof, that is, when the transfer bits are projected to the position illustrated in Figs. 23 and 24. While the dimensions of the transfer bits and needles may be varied within limits, it has been found, for example, in a welt hosiery machine having a needle cylinder of 3¾" diameter and with 480 needles, that transfer bits of approximately .037" (Fig. 11) will crowd the needles on each side thereof, the space between such needles being slightly under .037". We find that in fine-gauge machines these transfer bits, at their point of maximum thickness (namely, at the bends $t^4$, $t^9$), are approximately .037±" to .039" in width, which may be almost equal to, or preferably slightly greater than, the distance between the adjacent faces of two needles in the needle cylinder, spaced one apart. When there is added to this dimension the thickness of the yarn loop lying in the hook of the transfer bit, the dimension of the elements which have to go between two adjacent needles spaced one apart is greater than the spacing of those needles, thus making a tight fit.

In Figs. 8, 9, 10 and 12, and for the purpose of showing the various steps of knitting, the needles and sinkers S are shown more widely spaced than in actual practice, the preferred spacing and relative dimensions being illustrated in Figs. 23 and 25.

In Fig. 25 the needles 1', 2', 3' and needle walls 261 of the needle cylinder 260, as well as the transfer bits T, are shown greatly enlarged in order to illustrate certain relative dimensions that are important insofar as the centering of the transfer bits is concerned. The relative dimensions of the transfer bits, the needles and needle walls may vary.

In a 480-needle knitting machine employing a cylinder of what is known as 3¾" diameter, as referred to above, the over-all dimension in maximum width of the transfer bits (Fig. 25) permissibly may vary from .036" to .041", although the best results are obtained within the limits of .036" or .037" to .039". The needle walls 261 in such case are approximately .010" in thickness, whereas that portion of the needles seated within the slots is approximately .012½" in thickness. As hereinbefore stated, the thickness of the needles where they are engaged by the transfer bits (Figs. 23 and 24) is approximately .010½". If the thickness of the needles or needle walls were reduced below the dimensions mentioned, the over-all dimension of the transfer bits could be increased correspondingly.

As shown in Figs. 23 and 24, the yarn of the loops 21 and 21' comes between the sides of the transfer bit and adjacent needles. The thickness of the yarn is approximately .001½", which is compensated for by the side play of the needles in the needle walls, that is, each needle has a play of about .001½" in the direction of each needle wall. Another factor permits a somewhat greater over-all dimension in width of the transfer bits, namely, when the transfer bits are projected to the position shown in Figs. 23 and 24, the spreading needles exert a counter-pressure on the side walls of the transfer bits, causing them to be compressed slightly.

Although certain dimensions have just been given by way of example, a circular machine to carry out the method of the invention, in its broader aspects, calls for such a relative dimension of the transfer bits in comparison with the space between the needles on each side thereof (Fig. 23) as to provide a snug fit of the transfer bits, with the yarn thereon, between the adjacent raised needles, to the end that such transfer bits will be maintained directly over and in alignment with their companion and depressed needles 3', so that on elevation of the needles they shall pass through the transfer bits and loops 21, 21' held thereon (Fig. 12).

Such a numerical proportion of welt needles and intervening needles as will provide at least two adjacent intervening needles (Fig. 23) permits the needles to bend over toward one another, if necessary, and this bending is accentuated by reason of the thickness of the interposed yarn on each side of a transfer bit. The bending, however, is not sufficient to result in permanent distortion of the needles. A wedging action or snug fit without bending of the needles is within the scope of the invention.

If the welt and intervening needles were arranged in a 1 x 1 spacing relation, then there would be single needles only between adjacent transfer bits, which would preclude the mentioned permissible bending of the interposed needles.

The provision of two loops 21, 21' serves a useful purpose in connection with accurate transferring and good fabric. When single loops only are formed, it sometimes happens that a transfer bit T will hang onto such loop and not release it when the transfer bit is retracted. Such holding of the single welt loop tends to pull the single thread through adjacent wales, the action being much the same as that of a drawstring. On the other hand, when two loops 21, 21' are formed in adjacent courses, any tendency of a transfer bit to hang onto the loops, upon retraction of the transfer bit, is resisted by the two loops 21, 21', such resisting probably being due to a drawing together of the loops in the adjacent courses to which the loops 21, 21' are connected. Such drawing together apparently binds the thread at the said adjacent loops. In any event, the two loops 21 and 21' are not retained in the hooks of the transfer bits on retraction thereof.

From the foregoing description of the fabric of Figs. 1 and 2 and the method of making it, the modified fabrics illustrated in succeeding figures and the method of making them will be understood by those skilled in the art.

The modified fabric shown in Fig. 17 is like that shown in Fig. 1, except that single loops 21 are shown, thus eliminating the fourth course of Fig. 1. Also in Fig. 1 the loop 100 in the first course occurs in wale 1, so that wale 2 intervenes between loop 100 and the welt wale 3. In Fig. 17 the loop 101 in the first course occurs in wale 2 next to the welt wale. Reading from right to left in Fig. 17, the wale sequence shown may be secured by the method of arranging the needles so that a long butt jack needle knits forming wale 2, followed by a jackless needle forming wale 3, and then by a short butt jack needle forming wale 1. In contrast, to form the fabric of Fig. 1, as shown by Figs. 4 to 7, the long butt jack needles knit first, followed by the short jack needles, in turn followed by the jackless needles. Different arrangements of the needles can be chosen without departing from the invention. The wale and course arrangement in Fig. 17 otherwise is like that shown in Fig. 1.

In the modified fabric of Fig. 18, the first course is formed in the same manner as the first course of Fig. 17, i. e., by causing the needles pertaining to long butt jacks to engage yarn for this course. The second course is formed by causing the needles pertaining to the short butt jacks to be elevated to take yarn for this course, the long butt jack needles also taking yarn and drawing loops of stitches 126 through the first course yarn loops 127. For the third course all of the needles are elevated to take yarn, the long butt jack needles drawing stitches 128 through previous course loops 126, and the short butt jack needles drawing stitches 129 through previous course loops or yarn 130. For the fourth course the needles pertaining to the long and short butt jacks continue to knit, whereas the jackless needles are depressed, the transfer bits moving out and engaging yarn in their hooks, which they hold in the form of loops 131 during the knitting of the welt fabric. For the fifth course the needles pertaining to the long and short butt jacks continue to knit, the jackless needles, however, not taking yarn for this course to avoid the breaking of stitches, as hereinbefore explained, the yarn floating across the wales knitted by the said jackless needles. The loops 132 drawn by the jackless needles 3' during the knitting of the third course are cast off their needles while the sixth course is being knitted and when loops 133 of that course are drawn therethrough. The transfer course is formed like that of Fig. 1.

In Fig. 19 is shown a still further modified form of inturned welt construction. The numerals 134, 135, 136 and 137 represent a sequence of four wales which are repeated, circumferentially, throughout the top of the stocking.

In knitting this form of welt, yarn is taken for the first course on every other needle, i. e., by the needles knitting the wales 134 and 136, and for the second course by every needle, stitches 138 and 139 being drawn by the needles at wales 134 and 136. For the third and fourth courses the yarn is taken in all the wales, but stitches are drawn by the needles knitting only the wales 134, 135 and 137. The needles knitting the wales 136 are depressed during the knitting of these courses, transfer bits T being projected to engage the yarn loops 21, 21' in their hooks, after which they are partially retracted. The fifth and sixth courses are then knitted, the needles that knit the wales 136 holding their previous course loops 139 but not knitting. The knitting of the following courses occurs at all of the wales until a sufficient length of welt has been formed. After a sufficient number of courses have been knitted to form the welt, a transfer course is formed in the manner disclosed in connection with the welt of Fig. 1.

In Fig. 20 is shown a welt fabric slightly modified as compared with the welt fabric shown in Fig. 18. Whereas in Fig. 18 a single course is shown where the yarn floats across the welt wale, in Fig. 20 two such courses are shown, i. e., the fifth and sixth courses.

In Fig. 21 is shown a modified welt fabric similar to that shown in Fig. 19, except that in Fig. 21 a single welt loop 21 is shown.

In Fig. 22 is shown a further modified form of inturned welt fabric and wherein there are three wales 40, 41 and 42 between adjacent welt wales 43, as distinguished from the arrangements shown in the other figures of the drawings, where there are only two non-welt wales between the welt wales. The sequence of wales 40, 41, 42 and 43 preferably is repeated throughout the circumference of the make-up and inturned welt courses. One method for effecting the knitting of the make-up or starting courses for the welt is as follows: As shown in Fig. 22, the yarn, for the first course of knitting, is engaged in the hooks of alternate needles, i. e., the needles that knit the wales 40 and 42. In the knitting of the second course all of the needles engage yarn in their hooks, the needles that knit the wales 40 and 42 drawing loops 44 and 45 through the first-course yarn loops at 46 and 47. In the knitting of the third course the yarn is engaged in the hooks of the needles that knit the wales 40, 41 and 42, loops being drawn by these needles through previous course loops at the wales 40 and 42 and around the second-course yarn at the wales 41. During the knitting of the third course the needles that knit the wales 43 are inactive, not engaging yarn or casting off their second-course yarn. During this course of knitting, at the wales 43, the companion transfer bits T engage yarn to form the welt loops 48.

The needles that knit the wales 43 remain inactive during the knitting of the fourth course, the transfer bits T being partially withdrawn with their loops 48. The remaining needles knit in the usual manner. Following the fourth course of knitting, all the needles knit a sufficient number of courses to form the inturned welt at the termination of which a transfer course is knitted. At this time the transfer bits T move to the position shown in Fig. 24 over companion needles. The needles are then elevated (Figs. 13, 14 and 15) to pass through the welt loops 48 and previous course loops 49, then engaging yarn and drawing the same through the welt and previous course loops, as illustrated in Fig. 16.

Whereas in Fig. 22 a single welt loop course and a single course (4th course) where the yarn floats across the wales 43, have been disclosed, this disclosure is by way of example only, without any intention of limiting this phase of the invention to single courses in either instance. Furthermore, in any of the welt constructions illustrated in the drawings, two separate-course welt loops and two float courses are desirable, but not essential.

The spreading of the anti-run construction through several courses for the different wales in the novel fabric set forth in the following claims gives an advantageous combination of stretch and anti-run which is one of the values of the invention. It also gives the necessary slackness without the sleaziness arising from knitting all courses too slack.

Many variations which do not depart from the scope of the invention will occur to those skilled in the art.

What is claimed is:

1. A weft knit welt fabric, the first few courses including in at least one course, at least one welt loop at a recurring wale spaced apart at least two wales, there being one or more following courses having loops at all of the wales, the welt loops being interknitted with a following course of the stocking to form a welt.

2. A weft knit welt fabric having recurring groups of at least three wales which recur in each group and a first course having a loop in only one wale in each group, in combination with more than one subsequent course having a welt loop in another wale of each group interknitted with a following course of the stocking.

3. A welt fabric, the first few courses including in at least one course, at least one welt loop at a recurring wale, there being at least two non-welt wales between adjacent welt wales, in combination with at least one following course in which the thread forming the welt floats across the welt loop wales, there being a plurality of following courses knitted at all of the wales, at the termination of which the welt loops are interknitted with a following course of the fabric.

4. A weft knit welt fabric having recurring groups of at least three wales which recur in each group, and a first course having a loop in a recurring wale, in combination with more than one course near the first course, each having a welt loop in another wale of each group interloped with a loop of a course further removed from the first course, and one or more courses adjacent the welt loop courses containing floats but no stitch in the wales containing the welt loops.

5. A weft knit welt fabric having recurring groups of at least three wales and a first course having floats in at least one wale of each group, in combination with one or more floats in nearby courses in a wale of each group, and one or more nearby courses having a welt loop and a multi-course loop in the same wale of each group, said wales containing floats in an adjacent course on at least one side of the welt loops.

6. A weft knit welt fabric having recurring groups of at least three wales which recur in each group, a first course having floats in at least one wale of each group and an adjacent course containing a held loop in each group interlooped with a loop in a course spaced from that course by a plurality of courses, in combination with one or more courses adjacent said second-named course containing welt loops in the same wales as the held loops of the second-named course, and a plurality of intervening courses between the welt loop courses and a following course with which the held loops are interlooped, at least one of said intervening courses containing floats in the welt loop wales.

7. A weft knit inturned welt, the first few courses including at least two separate-course welt loops in at least one recurring wale, there being at least one non-welt wale between adjacent recurring wales, at least one following course in which the thread floats across the welt loop wales, there being at least one following course knitted at all of the wales, at the termination of which the welt loops are interknitted with a following course of the stocking.

8. An inturned welt for a knit stocking, the number of wales being a multiple of three, the first few courses including at least two separate-course welt loops at every third wale, at least one following course in which the thread forming the welt floats across the welt loop wales, there being a plurality of following courses knitted at all of the wales, and the welt loops being interknitted with a subsequent course of the stocking.

9. An inturned welt for a stocking comprising more than 400 wales, not more than one-third of which are welt wales interspersed among the other wales in regular sequence, the first course of the welt being set up at a recurring wale only, the second course of the welt including knitted stitches at the wale first mentioned and setting up stitches at the intervening wales, the third and fourth courses of the welt including knitted stitches at the wales other than the welt wales and welt-forming loops at the said welt wales, the fifth course of the welt including knitted stitches at some at least of the wales, there being a plurality of following courses knitted at all of the wales, at the termination of which the welt loops are interknitted with a following course of the stocking.

10. A knitted welt fabric having recurring wales and a plurality of separate-course welt loops at wales whose recurrence is spaced apart by at least two other wales, at least one of said loops bulging laterally beyond another.

11. A knitted welt fabric having recurring wales and welt loops at wales whose recurrence is spaced apart by at least two other wales, in combination with knot-like formations in the initial courses between the wales containing the welt loops.

12. A weft knit welt fabric having welt loops at recurring wales and knot-like formations in the initial courses at sinker wales between the wales containing the welt loops.

13. A weft knit welt fabric having recurring wales, welt loops in one or more courses at each recurrence of a wale and knot-like formations in the initial courses located between the welt wales, said knot-like formations involving the ends of the arms of the welt loops.

14. A weft knit welt fabric having recurring wales, two or more separate-course welt loops at each recurrence of a wale and loops in the welt wales extending over a multiplicity of courses in the opposite direction from the welt loops.

15. A weft knit welt fabric having recurring wales and two or more separate-course welt loops at each recurrence of a wale, in combination with loops in the welt wales extending over a multiplicity of courses in a direction opposite to that of the arms of the welt loops, the ends of the welt loops and multi-course loops, joining in knot-like formations between the recurring welt wales.

16. A knit welt fabric for a stocking top, comprising starting courses and a plurality of welt loop courses having recurring welt loops, said welt loops being spaced by at least two non-welt loop wales in one or more courses, and loops in the welt loop wales extending over a multiplicity of courses in a direction opposite to that of the welt loops, the ends of the arms of the welt loops and multi-course loops joining in knot-like formations in said starting courses between adjacent recurring welt wales.

17. A method of knitting an inturned welt for a stocking including forming a first course of the welt by setting up loops at recurrent wales only, forming the second course of the welt by knitting stitches at the wales first mentioned and setting up stitches at intervening wales, forming the third and fourth courses including setting up welt-forming loops at welt wales and knitting stitches at the wales other than the said welt wales, forming a subsequent course including knitting stitches at some at least of the wales, then forming a plurality of courses knitted at all of the wales, and terminating the welt by interknitting said welt-forming loops with a following course.

18. The method of knitting a fabric comprising forming a first course slack, successive loops in said course being spaced apart by a space which is at least equal to two wales in the fabric, knitting courses each having a multiple of the number of loops contained in the first course, said courses including loops recurring between the wales which contain the first-course loops, knitting at least one later course, withholding there-from at least one of said recurring loops formed in said second-named courses, interlooping the withheld loop from one second-named course with loops in a still later course, knitting a plurality of courses and interlooping the withheld loops of another of said second-named courses with recurring loops of a still later course.

19. A method of knitting a welt including forming a course slack, successive loops as initially formed in said course being spaced apart by at least two wales in the fabric, knitting at least two courses of a second type having loops a multiple of the number of loops in the first-named course, withholding at least one of said loops, interlooping the withheld loops from the earlier of said courses with a later course on the same side of the welt and interlooping the withheld loops of at least one other of said courses with loops of a later course on the other side of the welt.

20. A method of knitting a fabric comprising forming a first course slack, successive loops in said course being spaced apart by at least two wales in the fabric, knitting a second-type course having at least two additional recurring loops between the loops of the first-named course, withholding at least one of said recurring loops from a plurality of succeeding courses, knitting at least one course of a third type having the same number of loops as the second-type course but withholding from at least one succeeding course at least one loop in each recurring group of loops of said third type, knitting at least one course of a fourth type having fewer stitches than the second-named course, each loop of said fourth-type course being interlooped with a corresponding loop of the immediately preceding and succeeding courses and floating the thread of said fourth type of course across the wale where a loop is omitted, knitting a fifth type of course having the same number of loops as the second-named course and interlooping part of the loops thereof with the loops of the immediately preceding course and other loops of the fifth-type course with the recurring withheld loops of the second-named type of course; knitting a plurality of courses; and completing the welt by interlooping with every third loop of an otherwise normal later course the withheld loops of the third-type course.

21. A knitted inturned welt for a stocking top, recurrent wales being welt wales having welt loops and there being at least two non-welt wales therebetween, the welt wales being connected to the leg courses of the stocking top to form an inturned welt, the connection for the inturned welt being assisted by centering the welt loops of the welt wales with respect to the connecting loops of a leg course to insure connection of the inturned welt to the leg courses at each of the welt wales.

ALBERT E. PAGE.
FRANK R. PAGE.